Patented Nov. 11, 1924.

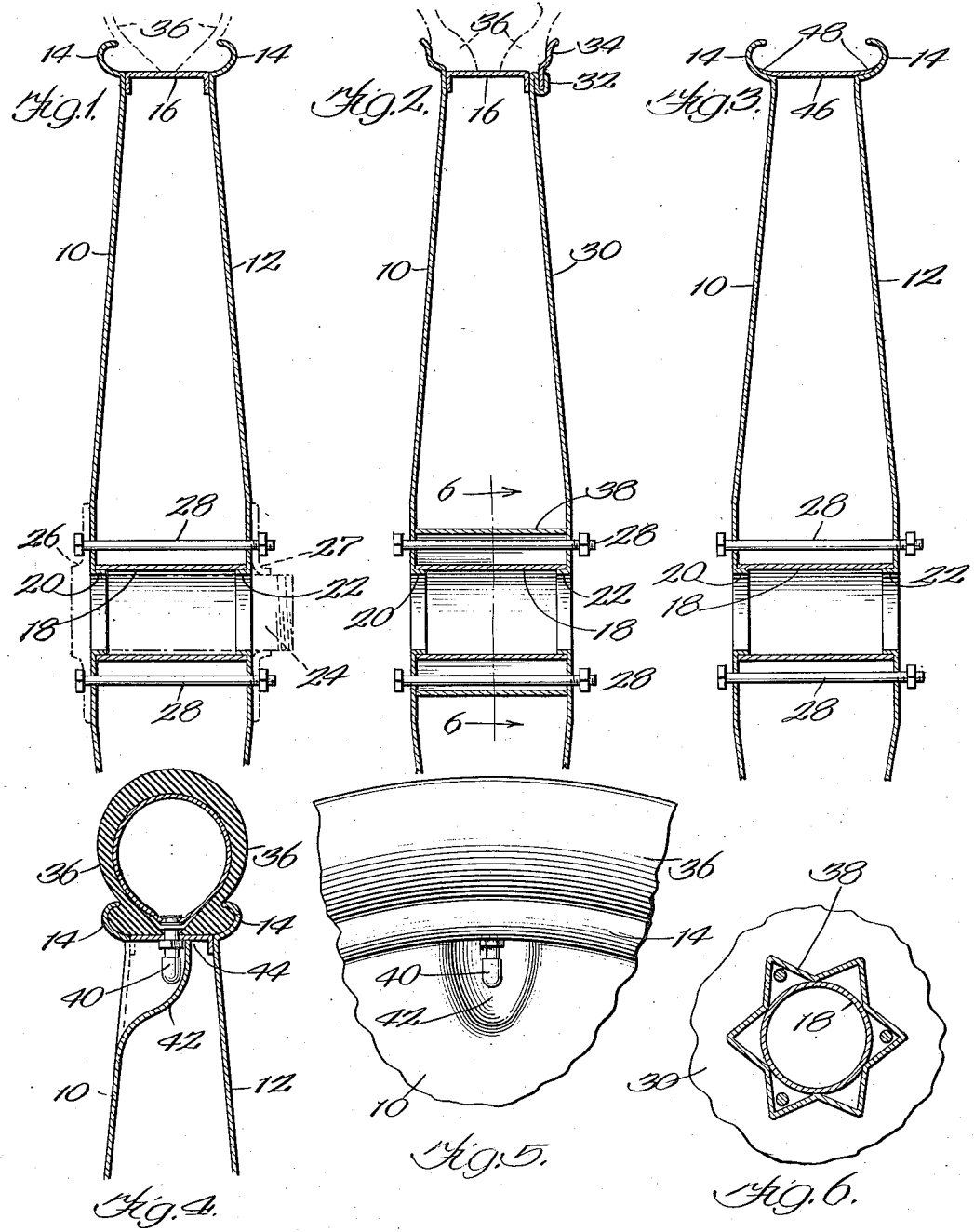

1,515,144

UNITED STATES PATENT OFFICE.

JAMES A. CHARTER, OF CHICAGO, ILLINOIS.

WHEEL.

Application filed August 25, 1922. Serial No. 585,115.

*To all whom it may concern:*

Be it known that I, JAMES A. CHARTER, residing at Chicago, in the county of Cook and State of Illinois, a citizen of the United States of America, have invented a certain new and useful Improvement in Wheels, of which the following is a specification.

This invention relates to vehicle wheels, particularly those made of separated metallic discs, unperforated between the hub and rim. The object of the invention is to provide a wheel of this type which is of exceedingly simple construction and is especially easy and inexpensive to manufacture, but which is yet rigid and satisfactory in operation. The invention consists particularly in a wheel of this type in which the side plates of the wheel are either integral with or directly support the flanges which retain the tire in place on the rim of the wheel. The invention further consists in many details of construction which will be hereafter more fully set forth in the specification and claims.

Referring to the drawings in which like numerals represent the same parts throughout the several views:

Figure 1 is a sectional view through one form of wheel embodying the invention in its preferred form, in which a channel shaped spacing device or rim is used.

Figure 2 is a modified view of the parts in Figure 1 in which the tire retaining ring is made separable from one side of the wheel.

Figure 3 is another modification of the structure of Figure 1 in which a flat plate is substituted for the channel of Figure 1.

Figure 4 is a sectional view of the rim portion of the wheel in Figure 1 but taken at a different point on the circumference of the wheel, showing a special construction in order to allow for access to the tire inflating tube.

Figure 5 is a side view of the parts of Figure 4, taken from the left hand side thereof.

Figure 6 is a sectional view on the line 6—6 of Figure 2.

In constructing the wheel of this invention, as illustrated in Figures 1 and 3, two oppositely disposed side plates 10 and 12 are provided, substantially identical in construction, each of which terminates, in an integral tire retaining flange 14. These plates 10 and 12 are separated from each other at the rim of the wheel by the annular channel shaped rim 16, welded thereto in the obvious manner. The plates 10 and 12 preferably but not necessarily diverge from each other as they approach the hub or center of the wheel, and are there spaced apart in these figures by the insertion of a thimble or tube 18 into which flanges 20 and 22 respectively on these plates are turned in the process of manufacture and welded. Figure 1 suggests the manner in which the wheel is secured in place on the vehicle shaft 24, viz, by use of suitably arranged locking plates 26 and 27, without novelty, held in place by any suitably means, such as bolts 28.

In the modified form of construction, shown in Figure 2, all of the parts at the rim of the wheel are identical with those of Figure 1 except that a new side plate 30 takes the place of plate 12, differing from it only at its rim where instead of having a continuous flange 14 formed thereon, the circumference of the plate is bent into the U-shaped form 32 in which a detachable ring 34 of any well known construction is adapted to detachably fit to fasten the tire 36 in place after having been put upon the rim member proper 16. This forming the U-shaped, rim retaining member 32 on the side plate 30 is very important in wheels of this class for the reason that it greatly simplifies the tire retaining device and materially reduces the cost of wheel.

Figure 2 further differs from Figure 1 only in that instead of the plain cylindrical tube 18 of Figure 1 being used to separate the central portions of the discs, as in Figure 1, an additional separating member 38 of any suitable construction, in the particular case here illustrated the star-shaped form of Figure 6, is inserted to help tube 18 in its spacing function of holding the center of the wheel parts rigid outside the ring of bolts 28. The tire 36 is necessarily provided with the usual tube 40 for inflating purposes and in order to allow access to this one of the plates, as 10, is in the process of manufacture, bent to form an indentation 42 which provides clear access to the tube 40 from the left, as shown in Figure 4 in the obvious manner.

In the particular case here illustrated, the portion of the metal of plate 10 is sheared or left unsoldered along the line 44 away from rim member 14 a sufficient distance to allow for tube 40 and is forced back to the position shown in Figure 4, before soldering.

In the modified form of construction in Figure 3, a separating plate 46 is substituted for the channel iron 16. In the particular case here illustrated, this plate is tapered off at portion 48 so as to nicely fit adjacent flange members 14 and is welded to the plates along the lines of contact between plate 46 and the flange 14 as is entirely obvious in Figure 3.

Having thus described my invention, what I claim as new and desire to secure by Letters Patent, is:

1. A metallic wheel, having two widely spaced side plates and a rim plate, secured thereto, said rim plate being perforated at a point in its circumference to provide a tire air tube passage, there being formed in a portion of one of the plates only adjacent to the rim a depression for the reception of the valve, formed by separating a portion of the side plate from the edge of the separating member and forcing it back to a point behind that where the air tube passes through the rim, and there securing it clear of the other side plate to the rim, for the purposes set forth.

2. In mechanism of the class described, a pair of separated metallic side plates, spacing devices at the rim and hub separating said side plates to form a wheel of box like cross section, there being a U-shaped annular recess on the outer circumference of one of said plates for retaining a tire retaining ring, a tire retaining ring in said recess and tire retaining means at the outer edge of the other side plate for the purposes set forth.

3. In mechanism of the class described, a pair of separated metallic side plates, spacing devices at the rim and hub separating said side plates to form a wheel of box like cross section and secured thereto by welding, there being a U-shaped annular recess on the outer circumference of one of said plates for retaining a tire retaining ring, a tire retaining ring in said recess and tire retaining means at the outer edge of the other side plate for the purposes set forth.

4. A box section metallic wheel having one side plate bordered by an integral U-shaped flange in which is an annular recess for the retention of a tire retaining ring for the wheel.

5. A box section metallic wheel having a side plate in whose outer circumference is integrally formed a recess for the retention of a tire retaining ring for the wheel.

In witness whereof, I have hereunto subscribed my name.

JAMES A. CHARTER.